J. A. EVARTS.
Suspension Pulleys.

No. 144,078.  Patented Oct. 28, 1873.

UNITED STATES PATENT OFFICE.

JOHN A. EVARTS, OF WEST MERIDEN, CONNECTICUT, ASSIGNOR TO BRADLEY & HUBBARD, OF SAME PLACE.

IMPROVEMENT IN SUSPENSION-PULLEYS.

Specification forming part of Letters Patent No. 144,078, dated October 28, 1873; application filed September 24, 1873.

*To all whom it may concern:*

Be it known that I, JOHN A. EVARTS, of West Meriden, in the county of New Haven and State of Connecticut, have invented a new Improvement in Suspension-Pulley; and I do hereby declare the following, when taken in connection with the accompanying drawings and the letters of reference marked thereon, to be a full, clear, and exact description of the same, and which said drawings constitute part of this specification, and represent, in—

Figure 1:
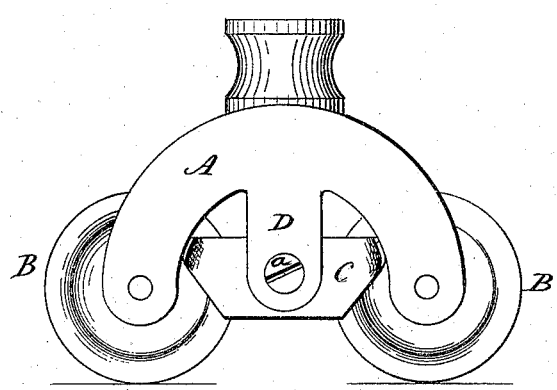
Figure 2:
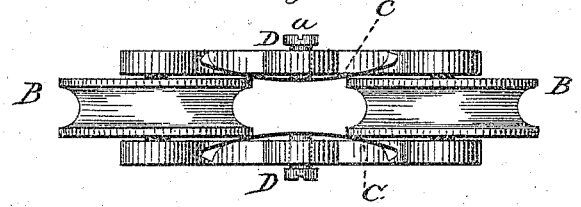

Figure 1 a side view, and in Fig. 2 a view from the under side looking up.

This invention relates to an improvement in pulleys, such as are used for suspending lamps, so that they may be drawn down—chains from the lamp running up over the pulleys and having a counter-balance attached to their ends. In the usual construction care has to be exercised in moving the lamp, because, if the weight is sufficient to support the filled lamp, so soon as any considerable portion of oil has been consumed the weight will overbalance the lamp, and cause it to rise and prevent its being supported, except at its highest elevation. To overcome this difficulty is the object of my invention; and it consists in applying an adjustable frictional bearing to the pulley, as more fully hereinafter described.

A is the yoke, supporting in each end a pulley, B, the yoke provided with means of suspension, in the usual manner. Between the arms of the yoke I arrange a flat sheet metal or equivalent spring, C, preferably, one upon each side. An arm, D, is formed upon the yoke, extending down over the spring C, and through this arm an adjusting-screw, $a$, is placed, by means of which the spring is caused to bear upon the pulleys to a greater or less extent, according as the friction is required to be more or less. The friction, however, should be sufficient to compensate for any difference which may exist between the weight of the lamp and the counter-balance.

While this invention is designed especially for the suspension of lamps or chandeliers, I do not wish to be understood as confining my invention to this purpose, as it is applicable for all purposes for which this class of pulleys are or may be employed.

I claim as my invention—

The combination of the springs C with the pulleys B, substantially as and for the purpose specified.

J. A. EVARTS.

Witnesses:
A. J. TIBBITS,
JOHN H. SHUMWAY.